Oct. 7, 1958 F. STEINBRECKER 2,854,830
SAFETY CLUTCH
Filed May 14, 1956
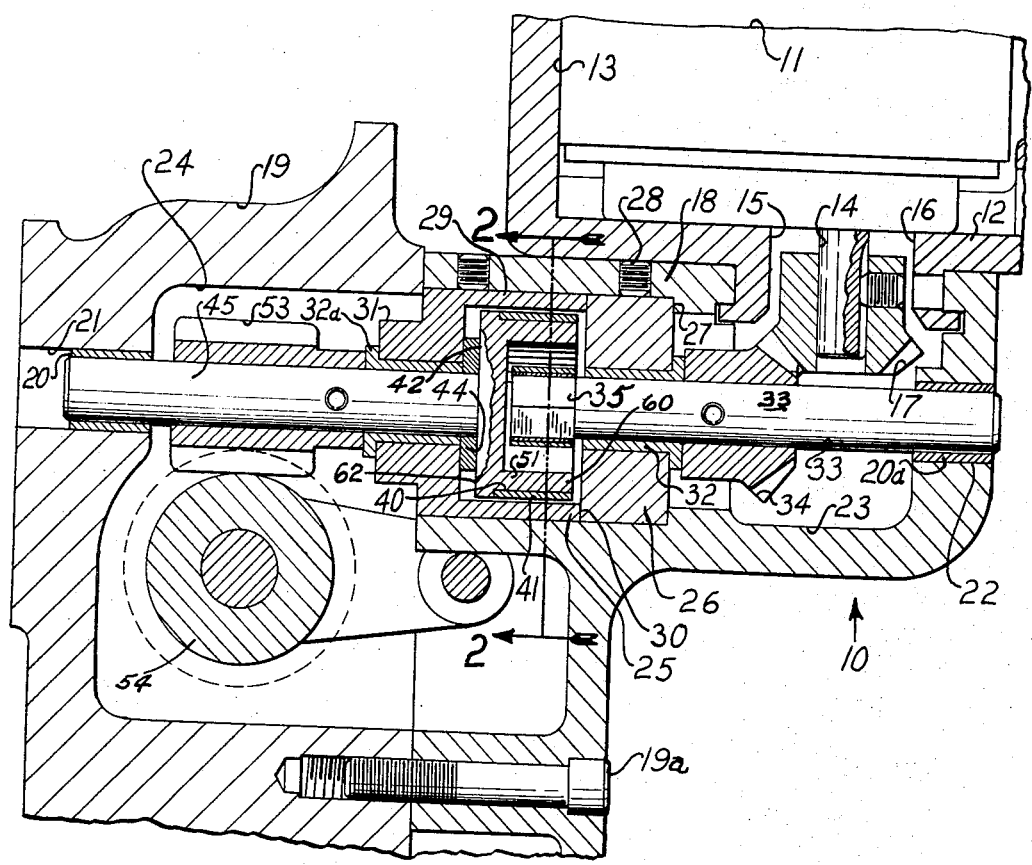
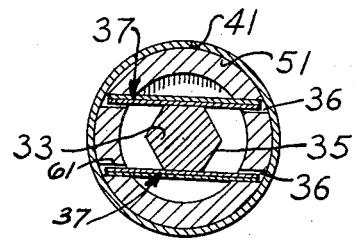
INVENTOR.
FREDDY STEINBRECKER
BY
ATTORNEY United States Patent Office 2,854,830
Patented Oct. 7, 1958

2,854,830
SAFETY CLUTCH

Freddy Steinbrecker, Racine, Wis., assignor to George Gorton Machine Co., Racine, Wis., a corporation of Wisconsin Application May 14, 1956, Serial No. 584,678

3 Claims. (Cl. 64—29)

This invention relates to a power spindle feed assembly and more particularly to a safety clutch used in the assembly.

The primary object of the invention is to provide a safety clutch which in reality is a power release for downward travel of a spindle. The distance the spindle feeds downward is first predetermined and a stop mechanism is provided to check the descent. Nevertheless, the motor providing power is still activating and accordingly still providing power to a gear train. So, while such activation is still taking place, some means must be provided to neutralize the power being transmitted. This is done by the safety clutch.

The particular advantage of the present safety clutch lies in providing a compact arrangement, doing away with bulky and expensive interlocking mechanism usually associated with a stop in a powered downward spindle feed.

An advantage lies in its adaptability to fit into a small amount of space and its simple assembly. The clutch is simple in construction, easy and comparatively inexpensive to build and especially suitable for the purpose intended. Its peculiar construction is such that, as it slips, a clicking indicates to an operator that the predetermined downward travel of the spindle has been reached.

My invention provides a motor driven shaft having one end hexagonal shaped and disposed between sets of leaf springs set crosswise in spaced slots in a slip coupling, which in turn rotates a slip coupling worm keyed or otherwise fixed to the slip coupling. This worm is part of the gear train which operates the mechanism for powering the downward feed of the spindle.

My invention will be better understood from the description thereof to follow, taken in connection with the accompanying drawing in which:

Figure 1 is a vertical cross-sectioned view of a spindle down feed assembly with my safety clutch in operative position.

Figure 2 is a section on line 2—2 of Figure 1 cut through the hexagonal end of a shaft engaging the leaf springs of the slip coupling.

Referring to the drawing, which illustrates the preferred embodiment of the invention, the numeral 10 designates the power down feed transmission unit with a motor 11 enclosed within a transmission housing 12 and supported on a bracket 13. A motor shaft 14 depends downward in opening 15 of bracket extension 16 having a clutch drive gear 17 keyed thereto.

The bracket extension 16 is arranged within feed gear housing 18. This housing 18 is secured to a spindle head 19 by spaced socket head cap screws 20 and two drill rod pins not shown.

In attached position housing 18 and spindle head 19 are provided with aligned openings 21 and 22 each having an oilite bearing 20 and 20a respectively. Feed gear housing 18 has an enlarged opening 23, while spindle head 19 has also an enlarged opening 24, both housing and head arranged whereby openings 23 and 24 are in communication with each other.

Opening 23 of housing 18 is counterbored to provide space for gear shaft bushing 26 which butts against shoulder 27 and is held in position by a set screw 28 threaded through a portion of said feed housing. Also disposed within said opening 23 is a slip clutch housing 25 which is provided with an enlarged cup-shaped portion 29—the end face 30 of which bears against the bushing 26. This clutch housing has a reduced extension 31 which is positioned within opening 24 of spindle head. Both the bushing 26 and clutch housing 25 have enlarged central openings wherein flanged oilite bearings 32 and 32-a respectively are positioned.

A gear-shaft 33 is mounted in oilite bearings 22 and 32 and has secured thereon a clutch driven gear 34 which is in mesh with clutch drive gear 17. This shaft 33 has an extension 35 which is shaped in the form of a hexagon.

A slip coupling 51 is provided with spaced longitudinal slots 36 which extend from the open end 60 of the coupling and are cut completely through the edge 61 of the coupling and extend back adjacent the base 62 of the coupling 51, whereby the coupling 51 is flexible in nature and retain a pair each of two leaf spring assemblies 37. In operative position, the opposed flat sides of the hexagon-shaped extension 35 bear strongly against and between said spring assemblies 37. To prevent any outward flexing of the slotted portions 36 of the clutch housing, I enclose a recessed section 40 about the outside surface of the housing with a spring retaining ring 41.

Spaced between the outside face 42 of the slip coupling 51 and the inside face surface of the clutch housing is an oilite thrust bearing 44.

A slip coupling shaft 45 is permanently fixed to the slip coupling 51 which in turn rotates a slip coupling worm 53, keyed or otherwise fixed to the slip coupling shaft. This worm is part of the gear train which operates the mechanism for powering the downward feed of the spindle.

This coupling worm 53 when in operative position is in mesh with and drives spindle gear 54.

From the above description it will be seen that I have devised a safety clutch which is particularly applicable for use with a power down feed spindle, and that its application to the form illustrated herein is illustrative and not limiting.

I claim:

1. A clutch assembly in combination with power spindle feed comprising a motor driven shaft and a slip coupling shaft, a slip coupling between said shafts and extending from one end of said coupling shaft, said coupling cup-shaped and having spaced longitudinally extending slots formed through the entire edge of the open end and extending inwardly a common distance to make said coupling flexible in nature, a band enclosing a portion of the outside surface of said coupling to prevent outward expansion of said coupling, each pair of opposed slots arranged to mount a resilient strip therebetween, one end of said motor shaft having multisided horizontally flat surfaces disposed between said resilient strips.

2. A clutch assembly in combination with power spindle feed comprising a motor driven shaft and a slip coupling shaft in alignment with each other, a slip coupling between said shafts and fixed to the end of said coupling shaft, said coupling having pairs of oppositely spaced slots cut through the entire edge of the open end of said coupling and extending inwardly and parallel to each other, a common distance to make said coupling flexible in nature, a band enclosing said slots and arranged to prevent outward flexing of said coupling, pairs of flat resilient strips disposed in opposite slots and arranged therebetween, said driven shaft having spaced horizontally arranged flat surfaces of approximately equal area gripped between said strips.

3. A clutch assembly in combination with power spindle feed comprising a motor driven shaft and a slip coupling shaft, a slip coupling between said shafts and extending from one end of said coupling shaft and fixed thereto, said coupling cup-shaped and having two pairs of longitudinally extending parallel slots cut through the entire edge of the open end and back a common distance to make said coupling flexible in nature, a band enclosing said slots and arranged to prevent outward flexing of said coupling, a pair of flat comparatively thin resilient strips disposed between and in opposite pairs of said slots, said driven shaft having multiside flat surfaces of approximately equal area disposed horizontally about said shaft, said pair of oppositely spaced flat surfaces held between said pairs of strips and outwardly flexing said strips upon rotative movement of said driven shaft and non-rotative movement of said coupling shaft.

References Cited in the file of this patent

UNITED STATES PATENTS

| | | |
|---|---|---|
| 1,962,993 | Leece | June 12, 1934 |
| 2,461,447 | Siesel | Feb. 8, 1949 |
| 2,637,987 | Hill et al. | May 12, 1953 |
| 2,688,857 | Jones | Sept. 14, 1954 |

FOREIGN PATENTS

| | | |
|---|---|---|
| 484,605 | France | July 28, 1917 |
| 749,550 | France | May 8, 1933 |